US008152542B2

(12) United States Patent
Kucera et al.

(10) Patent No.: US 8,152,542 B2
(45) Date of Patent: Apr. 10, 2012

(54) ELECTRICAL CONNECTOR ENCLOSURE

(75) Inventors: James P. Kucera, Spokane, WA (US); Paul N. Poshusta, Mica, WA (US); Jonathan E. Gessele, Chattaroy, WA (US)

(73) Assignee: Pantrol, Inc., Spokane, WA (US)

( * ) Notice: Subject to any disclaimer, the term of this patent is extended or adjusted under 35 U.S.C. 154(b) by 0 days.

(21) Appl. No.: 11/728,042

(22) Filed: Mar. 23, 2007

(65) Prior Publication Data

US 2008/0233795 A1 Sep. 25, 2008

(51) Int. Cl.
*H01R 13/44* (2006.01)
*H02B 1/04* (2006.01)

(52) U.S. Cl. ..................... 439/142; 439/144; 439/540.1; 361/647

(58) Field of Classification Search .................. 439/142, 439/144, 135, 136, 138, 540.1; 174/66, 67
See application file for complete search history.

(56) References Cited

U.S. PATENT DOCUMENTS

| | | | | |
|---|---|---|---|---|
| 4,215,236 | A * | 7/1980 | Reiser | 174/59 |
| 4,749,359 | A * | 6/1988 | White | 439/133 |
| 4,861,282 | A * | 8/1989 | Kobayashi et al. | 439/540.1 |
| 4,915,638 | A * | 4/1990 | Domian | 439/142 |
| 5,404,266 | A | 4/1995 | Orchard et al. | |
| 5,527,993 | A * | 6/1996 | Shotey et al. | 174/67 |
| 5,761,027 | A | 6/1998 | Flegel | |
| 5,816,854 | A * | 10/1998 | Baggett et al. | 439/540.1 |
| 6,457,843 | B1 * | 10/2002 | Kester et al. | 362/276 |
| 7,097,474 | B1 * | 8/2006 | Naylor | 439/135 |
| 7,136,278 | B2 | 11/2006 | Allen | |

* cited by examiner

*Primary Examiner* — Hien Vu
(74) *Attorney, Agent, or Firm* — Wells St. John P.S.

(57) ABSTRACT

An electrical connector enclosure which includes a framework having at least one wall, and which at least partly defines an internal cavity; and a moveable panel mounted on the framework, the panel being moveable between an open position and a closed position relative to the internal cavity, and wherein the at least one wall and the moveable panel cooperate to define a conductor aperture when the moveable panel is located in the closed position relative to the internal cavity.

9 Claims, 10 Drawing Sheets

ELECTRICAL CONNECTOR ENCLOSURE

TECHNICAL FIELD

The present invention relates to an electrical connector enclosure, and more specifically, to an electrical connector enclosure preferably used to temporarily connect an external generator to electrical switchgear.

BACKGROUND OF THE INVENTION

Many industrial and commercial sites require the ability to access temporary electricity sources when the normal source fails. For example, many telecommunications equipment cabinets are normally provided electricity by the local utility through the electrical power grid, but they also have internal batteries for backup in case the grid fails. Since the batteries have limited run time, however, many of these cabinets also have the ability to connect to an external, temporary generator that can be brought on-site to power the telecommunications equipment during long-term electric utility outages. Many other electrical switchgear cabinets, modular units, and commercial buildings also have facilities to temporarily connect electrical generators, including those used in construction sites.

Referring to FIG. 1, the traditional means for temporarily electrically connecting an external generator to a switchgear cabinet is a large, single cable connector with multiple pins. As shown in FIG. 1, these connectors are mounted on the outside of the cabinet and usually include a weatherproof cover over the connector for when the connector is not in use. One problem with this traditional connector is that many different connector sizes, pin counts, and configurations are utilized in the field, and matching up to any one configuration may be difficult. Therefore, when the need to connect a temporary generator arises, the connector supplied with the generator often does not match the connector supplied on the cabinet. Since these outages often occur during non-business hours and during extremely inclement conditions, procuring the appropriate connector is not always an option.

Another problem with the traditional connector is the handling of the connecting cable and connecting it to the connector. Since the traditional connector is a single cable connector with multiple pins for the multiple phases of the electrical generator, the connecting cable is often large, heavy, and unwieldy. Physically connecting the generator cable to the supplied switchgear connector is often an arduous task that is often exacerbated by the conditions that are extant when the external generator is needed. In some industries where temporary power connections must be frequently made, certain "quick-release" connectors have been developed and deployed. These connectors often connect only a single pin (or single phase) using a quarter-turn cam-lock connector or a half-turn cam-lock connector, that can be easily connected and disconnected. Quick release connectors have been used in some temporary power generation connection applications.

Yet another problem with traditional temporary connectors, and even with quick-release connectors, is that, when used, they are often not as secure as desired. Although the connectors and their enclosures may be sealed against weather when not in use, traditional connectors and connector enclosures cannot be secured against weather or vandalism while they are in use. Most connectors and enclosures employ a door or cover that is closed when not in use and open when in use. But when the door or cover is open, with the temporary conductors connected to the connector, the connectors are exposed to weather, small animals, vandalism, and unwelcome tampering.

It is an object of some embodiments of this invention to provide an improved secure electrical connector enclosure. Other objects, features, and advantages of this invention will appear from the specification, claims, and accompanying drawings which form a part hereof. In carrying out the objects of this invention, it is to be understood that its essential features are susceptible to change in design and structural arrangement, with only one practical, and preferred embodiment being illustrated in the accompanying drawings, as required.

BRIEF DESCRIPTION OF THE DRAWINGS

Preferred embodiments of the invention are described below with reference to the following accompanying drawings.

DETAILED DESCRIPTION OF THE PREFERRED EMBODIMENT

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms “a”, “an”, and “the” are not limited to one of such elements, but instead mean “at least one.”

Figure 1:
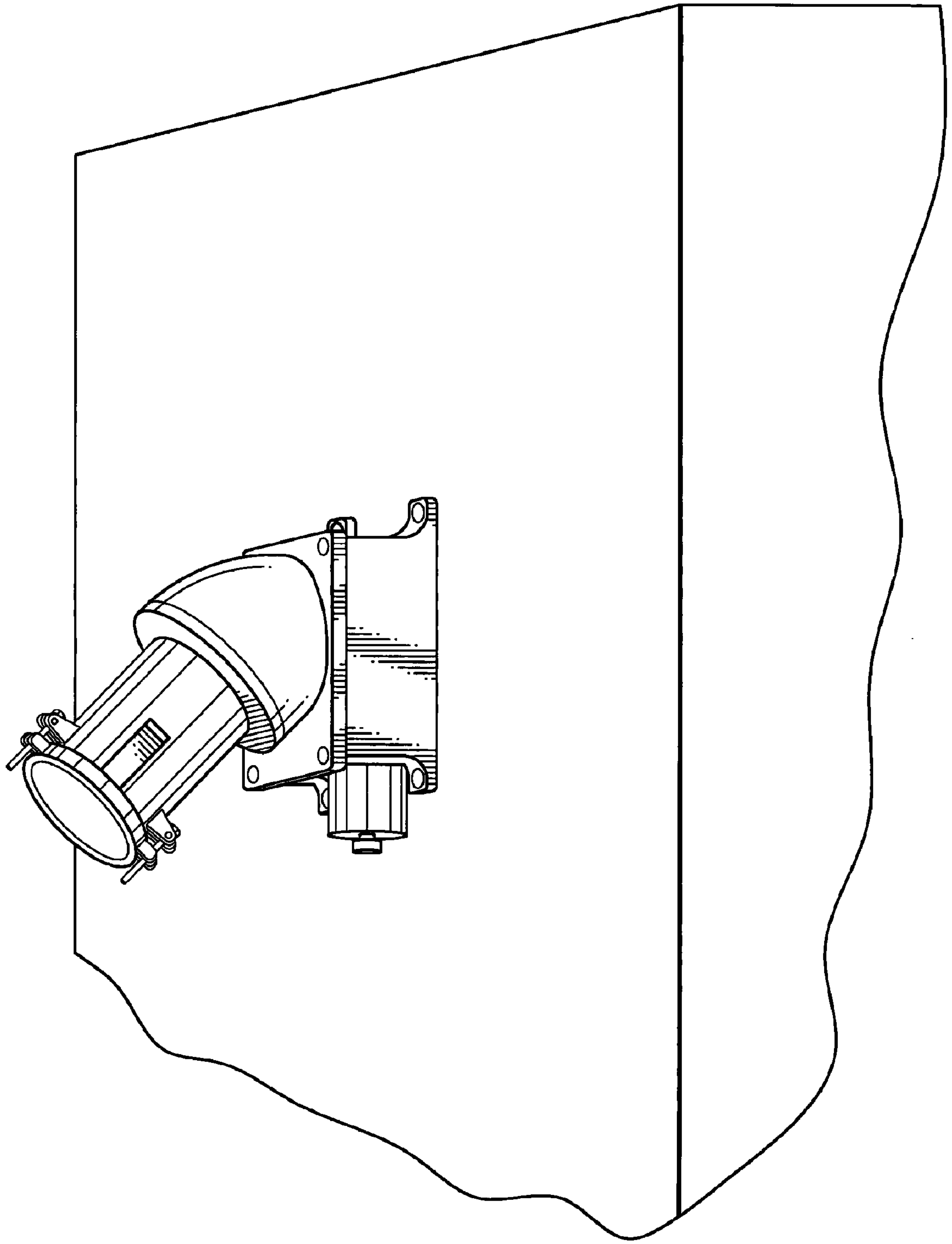
PRIOR ART Fig 1
FIG. 1 is a perspective view of one exemplary prior art configuration.
Figure 2:
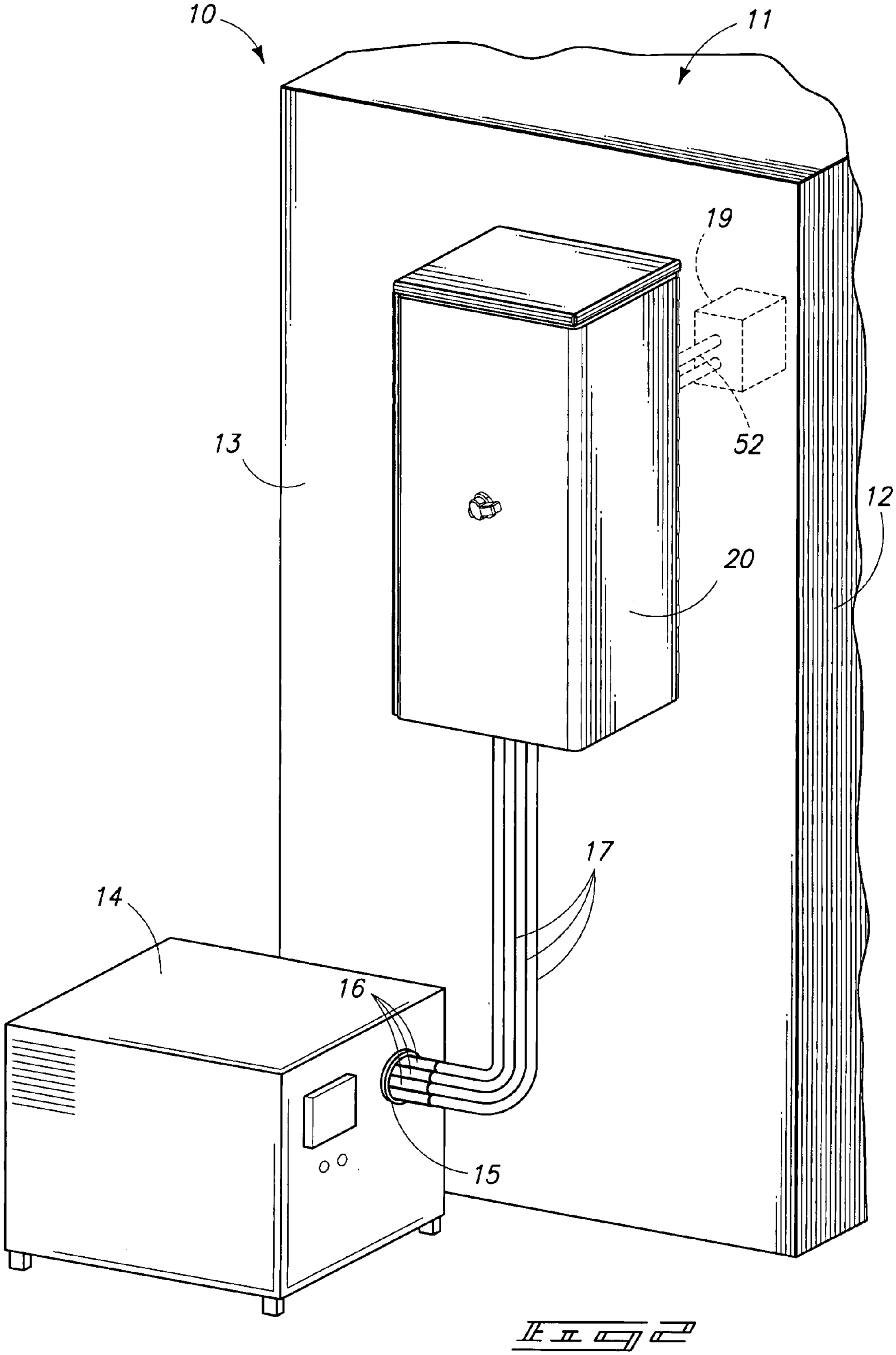
FIG. 2 is a perspective view of one embodiment of the invention as typically applied with a switchgear cabinet and a temporary electric generator.

Referring first to FIG. 2, the embodiment of the present invention shown in FIG. 2 is generally designated by the numeral 10. The invention as seen in that view is mounted on a switchgear cabinet 11, which has a front panel 12, and a side panel 13. The switchgear cabinet 11 houses any of a number of different types of electrical or electronic equipment 19, such as telecommunications equipment (including but not limited to rectifiers, switches, relays, transformers, power supplies, etc.), or electrical distribution equipment (including but not limited to circuit breakers, protective relays, transformers, motor control centers, etc.), or any type of electrical or electronic equipment that may require a source of electricity for operation. The switchgear cabinet 11 may be mounted outdoors or indoors, and the term “switchgear cabinet” may also refer to any permanent or temporary commercial structure which may house said electrical or electronic equipment. Electricity to power the electrical or electronic equipment that is housed in the switchgear cabinet 11 is normally provided by an electric utility (not shown). However, in the event that the normal source of electric power becomes unavailable, a portable electric generator 14 can be made available on a temporary basis. The temporary generator 14 can be one or more of any number of different types of temporary electric generators, including but not limited to small portable, gasoline-powered generators; large trailer-mounted, diesel-powered generators; fuel cells; photovoltaic cells; etc. As recognized by one skilled in the art, the term “temporary generator” may also refer to any other alternative power source other than the primary utility feed to the switchgear cabinet. The temporary generator 14 has an output panel 15 in which a number of connectors 16 are provided for connecting the generator output power cables or conductors 17 from the generator 14. The generator conductors or cables 17 deliver electrical power from the temporary electric generator 14 to the electrical or electronic equipment 19 housed in the switchgear cabinet 11 through an electrical connector enclosure 20, and then through switchgear conductors 52. An additional conductor 17 may be used to provide a non-power signal, such as an alarm or control signal. The electrical connector enclosure 20 is shown mounted on the side panel 13 of the switchgear cabinet 11 in the perspective view of FIG. 1, although one skilled in the art will recognize that the enclosure 20 could be mounted on any panel on the exterior or interior of the switchgear cabinet 11.

Figure 3:
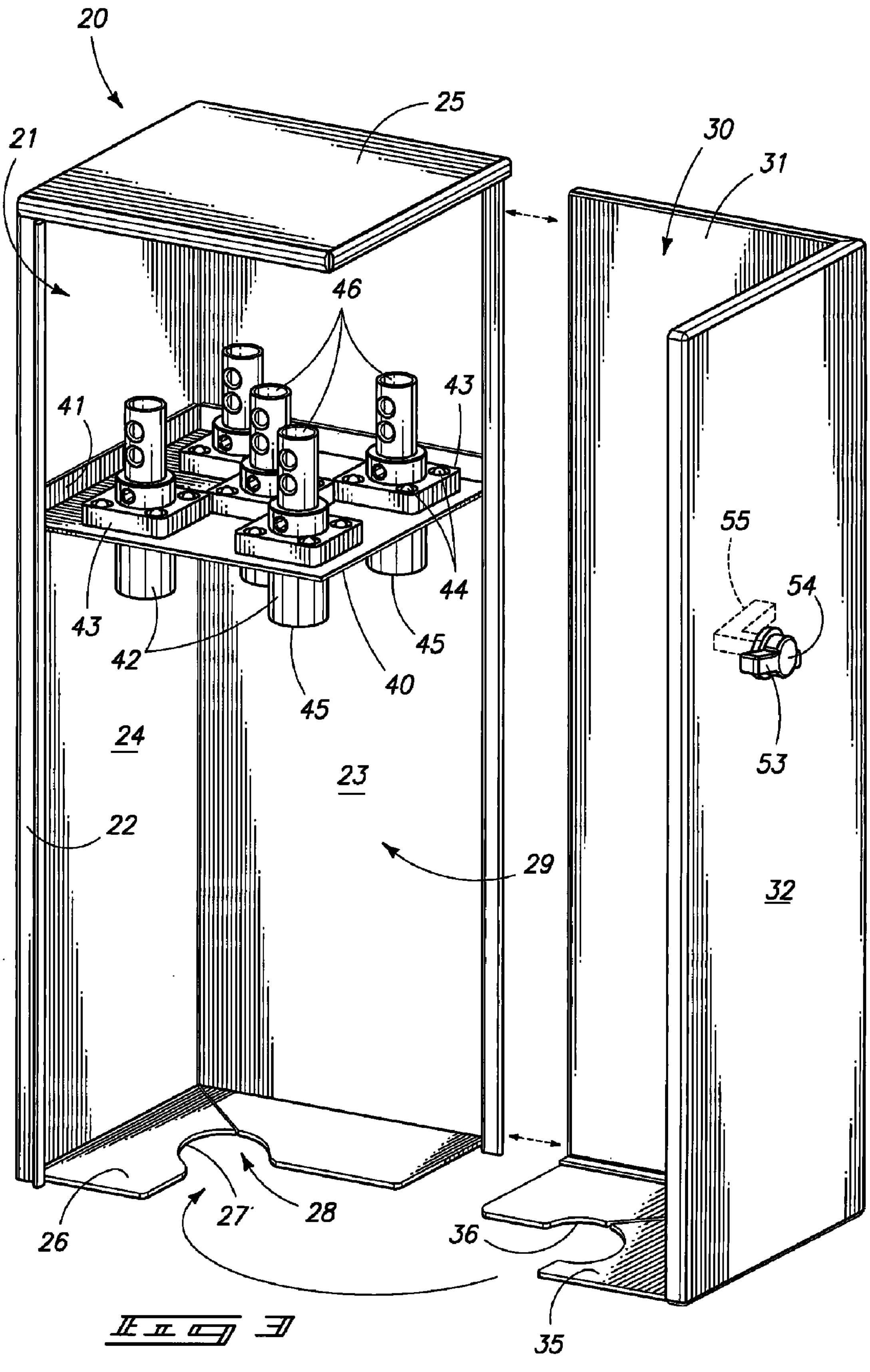
FIG. 3 is a perspective view of one embodiment of the invention with the moveable portion separated from the fixed portion.
Figure 4:
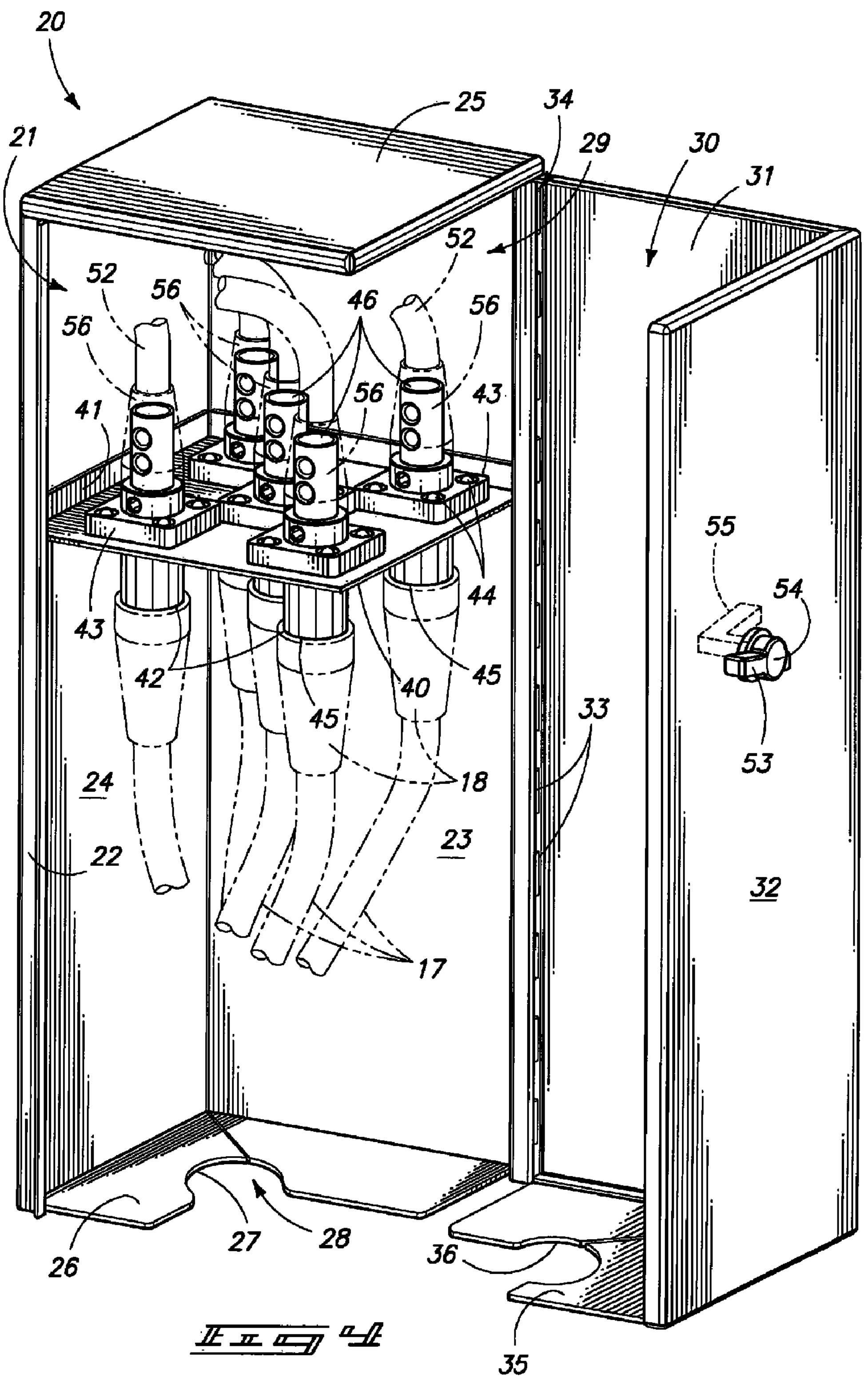
FIG. 4 is a perspective view of one embodiment of the invention with the moveable portion mounted upon the fixed portion.
Figure 5:
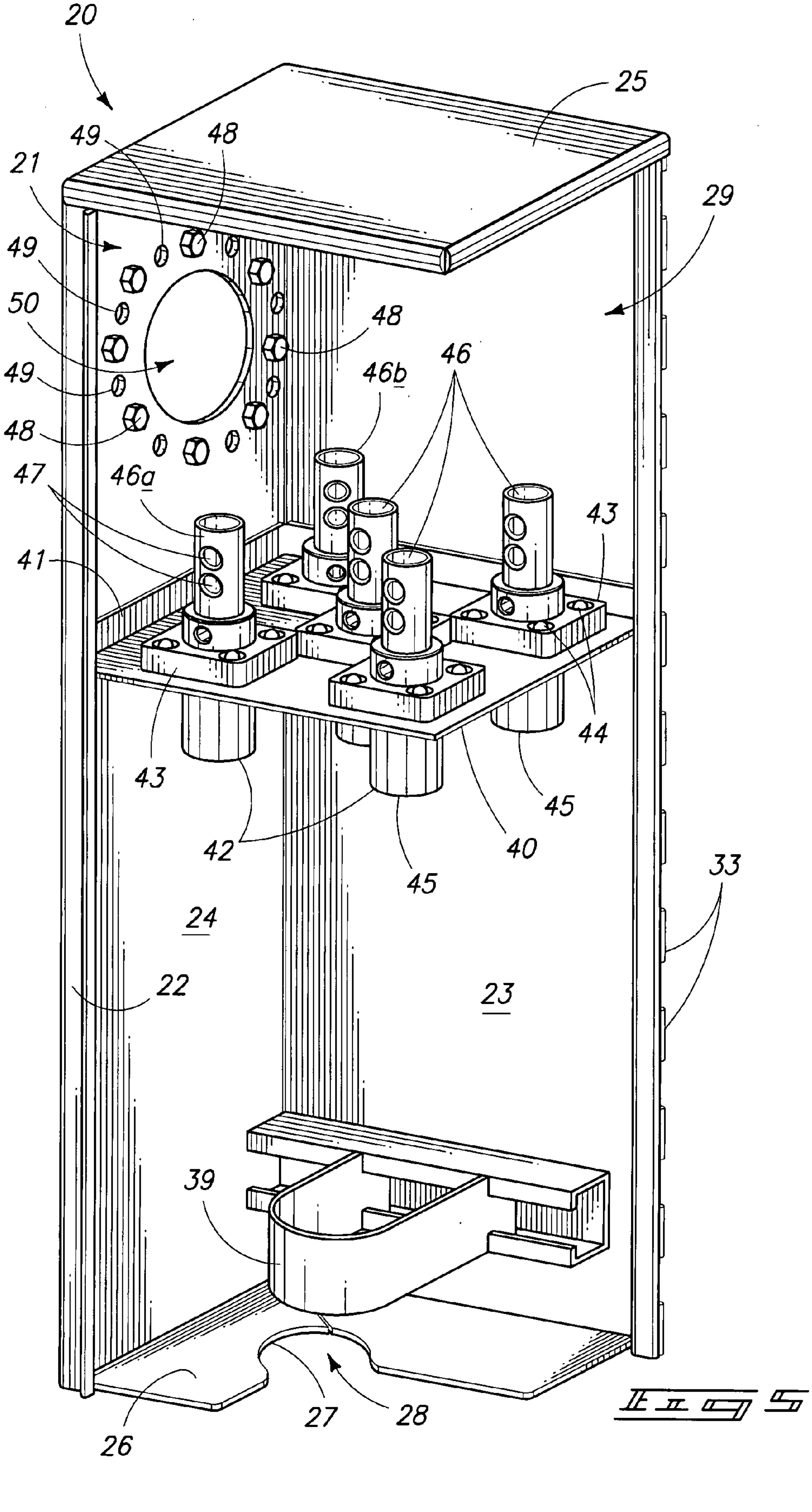
FIG. 5 is a perspective view of one embodiment of the invention in an unoccupied condition.

Referring now to FIGS. 3-5, the embodiment of the electrical connector enclosure 20 shown in these figures consists of a framework or housing 21 that is mounted or affixed to the side panel 13 of the switchgear cabinet 11 (FIG. 2). The framework 21, generally speaking, may include one or more fixed walls 23, 24, 25, and/or 26, which are defined herein as any sidewall, top, or bottom side, or may be a curved, cylindrical, or polygonal wall. The walls 23, 24, 25, and/or 26 of the framework 21 define an internal cavity 29. The framework or housing 21 is typically fabricated from sheet steel, although any suitable material may also be used, including aluminum, wood, high-impact plastic, or other material, with no one material in particular being required to practice this invention. In the embodiment shown in FIGS. 3-5, the framework consists a fixed portion 22 that includes a first side wall 23 and an adjacent and perpendicular second side wall 24. The fixed portion 22 also includes a top side wall 25 and a bottom side wall 26. The bottom side wall 26, as shown in FIG. 3, has a perimeter edge 27, which is shaped to form a conductor aperture 28, which will be discussed in greater detail below.

Referring still to FIG. 3, a moveable panel or moveable portion 30 is shown separated from the fixed portion 22 or framework 21 of the connector enclosure 20. The moveable panel 30 may consist of one or more walls 31, 32, and/or 35, as defined above. In the embodiment of the invention shown in FIG. 3, the moveable portion 30 consists of a third side 31 and an adjacent and perpendicular fourth side 32. The moveable portion or moveable panel 30 also has a bottom side 35, which has a perimeter edge 36, which is shaped to form a conductor aperture 28, which will be discussed in greater detail below.

Referring now to FIG. 4, the moveable panel 30 is moveably mounted to the framework or housing 21. The moveable panel 30 may be detachable from the framework 21, or it may be pivotally or hingedly mounted on the framework 21. In the embodiment of the invention shown in FIG. 4, the moveable portion 30 is hingedly mounted on the fixed portion 22 with a plurality of hinges 33. The hinges 33 allow the moveable portion 30 to pivot around the pivot axis 34 of the hinges 33. The moveable portion 30 can be located in an open position (as shown in FIG. 4) or in a closed position (as shown in FIG. 2). In the open position, access to the internal cavity 29 of the housing or framework 21 is provided. In the closed position, access to the internal cavity 29 is substantially prohibited.

Referring still to FIGS. 3-5, one or more quick-release connectors, generally indicated by the numeral 42, are mounted within the internal cavity 29 of the connector enclosure 20. The terms “quick-release connector” or “hand-manipulable” connector refer to any of a number of types of electrical connectors that can be easily connected or disconnected by hand or with minimal use of simple tools. Common types of quick-release connectors are quarter-turn cam and groove connectors, or half-turn cam and groove connectors. With this type of connector, the male connector is inserted into a female connector, and then one connector is turned ninety degrees with respect to the other, which causes a cam to be inserted into a groove, thus providing a substantially secure connection without the need for locking hardware, such as bolts, screws, nuts, locking rings, or ring clamps. Quick-release connectors are also known by those ordinarily skilled in the art as locking cam connectors, also referred to as cam-lock or camlock connectors, or by trade names such as CAMLOK, CAMLOC, or CAM-LOC. Various manufactures produce cam-lock connectors, which are typically compatible with each other, and are available in a number of mounting configurations. Of course, one skilled in the art will recognize that any of a number of different types of connectors or quick-release connectors may be used, and that a number of mounting configurations are possible within the contemplation of this invention. FIG. 4 also electrical generator conductors or cables which provide electrical power from the temporary generator and which are connected to the first, input end of one of the plurality of quick-realease connectors, and switchgear conductors which are equipped with corresponding connectors, as shown and described more fully relative to FIG. 6.

Referring now to FIGS. 3-6, a plurality of quick-release connectors 42 are mounted in a common mounting plane 40, which is attached to the fixed portion 22 or the framework or housing 21 with a mounting bracket 41. A common mounting plane is preferred, but is not required to practice the invention. In the embodiment shown in FIGS. 3-6, the common mounting plane 40 is horizontal with respect to the surface of the earth, although the mounting plane could be mounted in other orientations. Each of the quick-release connectors 42 have a base 43 which is mounted to the mounting plane 40 with common hardware 44, which may be screws, bolts, nut plates, adhesives, bushings, or any other means of fixedly attaching or disposing the quick-release connectors 42 to the mounting plane 40 (directly or indirectly). The connector bases 43 may be color-coded to distinguish the different phases of the electrical output of the temporary generator 14. Each of the quick-release connectors may have a first end 45 and a second end 46.

In the embodiment of the invention shown in FIGS. 3-6, the first end 45 has a female configuration and is oriented below the common mounting plane 40, and thus will act as the input end of the connector. In this same embodiment, the second end 46 has a male configuration and is oriented above the common mounting plane 40, and thus will act as the output end of the connector. One skilled in the art will recognize that the connectors 42 may have any of a number of orientations and mounting configurations depending on the application. Further, the connectors 42 may also be adapted for use in connecting a signal conductor, for providing an alarm or control signal to or from the temporary generator 14.

Figure 6:
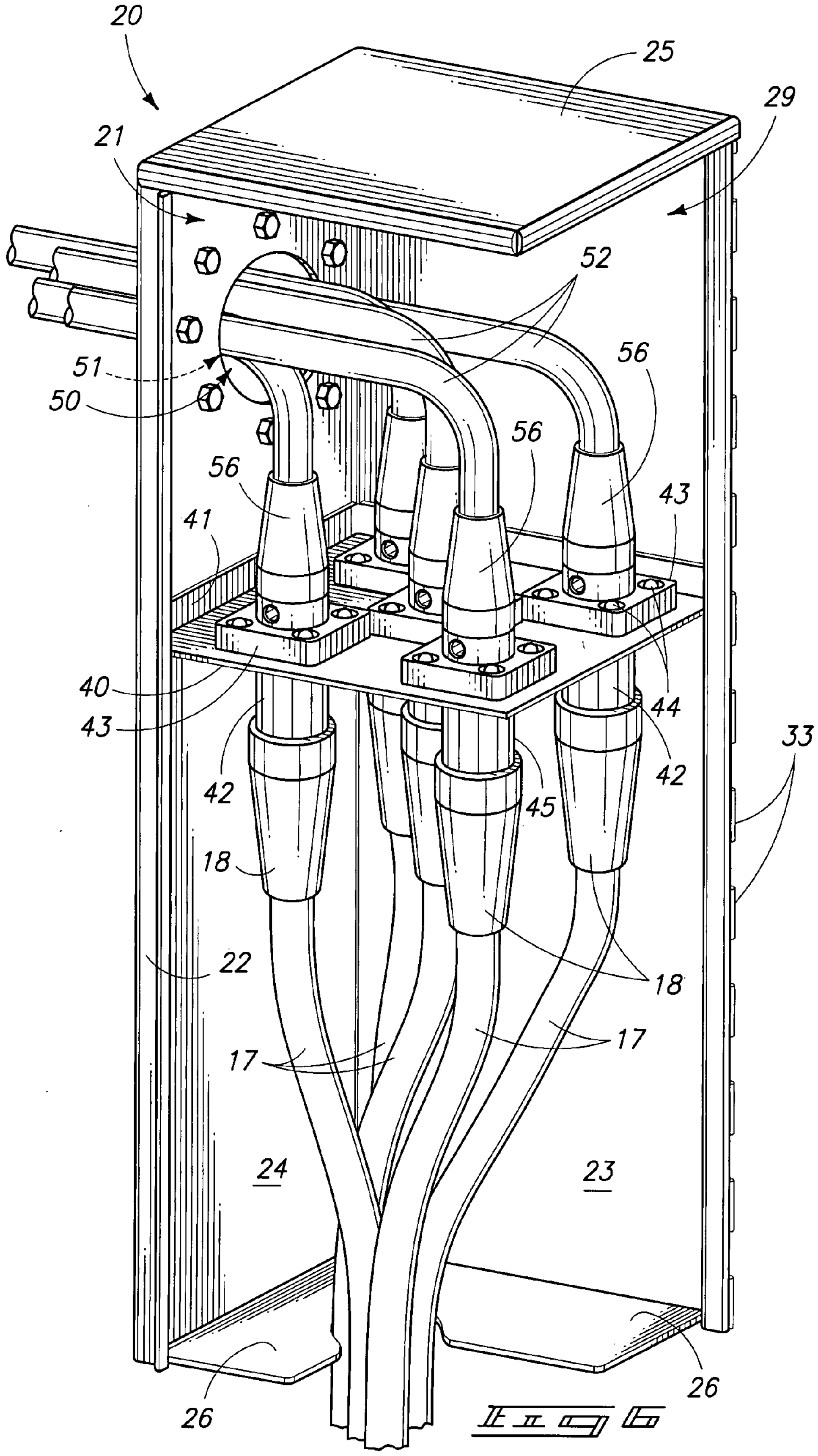
FIG. 6 is a perspective view of one embodiment of the invention in an occupied condition.

Referring now to the embodiment of the invention as shown in FIG. 6, the connector enclosure 20 is shown with electrical generator conductors 17 installed. The term "generator conductor" may include power and/or signal conductors. As described above, the electrical connector enclosure 20 is typically mounted on a switchgear cabinet 11. As shown in FIGS. 5 and 6, the first side 23 of the framework 21 or fixed portion 22 defines an aperture 50. This aperture 50 is coaligned with a similarly-sized aperture 51 on the side panel 13 of the switchgear cabinet 11. The aperture 50 as shown in FIGS. 5 and 6 conforms to a size and fastener layout that is substantially standardized in the industry, so that the connector enclosure 20 may be retrofitted into existing installations, although any aperture size, shape, or fastener configuration may be used. The aperture 50 and the switchgear aperture 51 together provide a passageway for one or more switchgear conductors 52, which are each connected to the second, output end 46 of one of the plurality of quick-release connectors 42. The switchgear conductors 52 are equipped with corresponding connectors 56 and the end of each conductor 52. The term "switchgear conductor" may include power and/or signal conductors. The other end of the switchgear conductors 52 (not shown) is connected to the electrical or electronic equipment housed within the switchgear cabinet 11. It is recognized that the switchgear conductors 52 are normally substantially permanently installed.

The term "substantially permanently installed" means that the switchgear conductors 52 are typically pre-installed when the connector enclosure 20 is installed onto the switchgear cabinet 11, and which is typically done at some point in time before the time when the temporary generator 14 is installed. The conductors 52 that are substantially permanent installed may be removed at some time in the future, but are typically not uninstalled after the time when the temporary generator 14 is no longer required. Stated another way, the terms permanently installed, permanent connection or permanently installed, does not mean they can or will never be disconnected, but it is a relative term generally meaning that the referenced connection or installation is typically not removed, including when compared to more frequently installed or removed connections or joints. The converse is true for what are referred to as temporary installations, temporary connections, temporarily installed, etc., i.e. it does not require that the connection be disconnected in operation, but instead that it is a relative term generally meaning it is more likely to be removed, disconnected or uninstalled, sometimes relative to another of the installations or connections. It will also be appreciated by those of ordinary skill in the art how this invention may also be utilized wherein the connections (even if labeled as temporary) will remain connected indefinitely.

FIG. 5 further illustrates other and/or additional possible aspects of the invention. FIG. 5 for instance illustrates how the second aperture 50 may be backwards or universally compatible with any one of a number of different apertures to which it is desirable to co-align or attach it. FIG. 5 shows a plurality of secondary connector apertures 49, which are not needed for connection compatibility with the existing application, but which are compatible with other possible applications, making this a more universally connectible and usable invention. Connectors 48, which may be any one of a number of different types of connectors or fasteners, such as bolts, as shown in a position to secure and co-align this second aperture 50 to other structures, housings or equipment, depending on the application. The aperture configuration shown in FIG. 5 may be configured to fit more than one corresponding aperture or bolt configurations to allow it to readily align or co-align in different applications and with different equipment from different manufacturers, all within the scope of some aspects of the invention.

FIG. 5 further illustrates another possible aspect of the invention which may be utilized in some embodiments. The second ends 46 of the quick release connectors generally include apertures 47 as shown in FIG. 5, which are used for connection purposes. FIG. 5 shows how in some aspects of some embodiments of the invention, some of the quick release connectors (or whatever other connector utilized as part of the invention) may be oriented at different angles or orientations to allow better or easier access thereto, including with hands, tools, etc. The apertures 47 of the second end 46*a* and second end 46*b* of those quick release connectors, are shown for example at a different angles than the apertures in others of the quick release connectors.

FIG. 5 further shows an additional aspect which may be utilized in some embodiments of the invention, a strain relief device 39, which provides an aperture through which the conductors may be routed and which may provide strain relief for the connections and enclosure.

Also shown in FIG. 6 are the electrical generator conductors or cables 17 which provide electrical power from the temporary generator 14 and which are connected to the first, input end 45 of one of the plurality of quick-release connectors 42. The generator conductors 17 are equipped with corresponding connectors 18 at the end of each conductor 17. It is also recognized that the generator conductors 17 are normally substantially temporarily installed. "Substantially temporarily installed" means that the generator conductors 17 are typically installed at the approximate time when the temporary generator 14 is installed, and which is at some point in time after the time that the connector enclosure 20 is installed onto the switchgear cabinet 11. The generator conductors 17 that are substantially temporarily installed may remain in place for extended periods of time after the temporary generator 14 is no longer required, but typically the generator conductors 17 will be uninstalled at the approximate time that the temporary generator 14 is no longer required. The condition of the connector enclosure 20 when the generator conductors 17 are normally not installed is defined herein as being in an "unoccupied" condition (as shown in FIG. 5), and the condition of the connector enclosure 20 when the generator conductors 17 are substantially temporarily installed is defined herein as being in an "occupied" condition (as shown in FIG. 6). In some forms of the invention, the generator conductors 17 may be at least temporarily secured to the connector enclosure 20 in the vicinity of the conductor aperture 28 with one or more strain relief devices (not shown), such as a clamp, which is fixedly attached to the interior or exterior of the connector enclosure 20. The strain relief device prevents undue force from being applied to the connectors 18 and 42 by the weight of the generator conductors 17 or by any other force pulling the conductors against the connectors 18 and 41.

Figure 7:
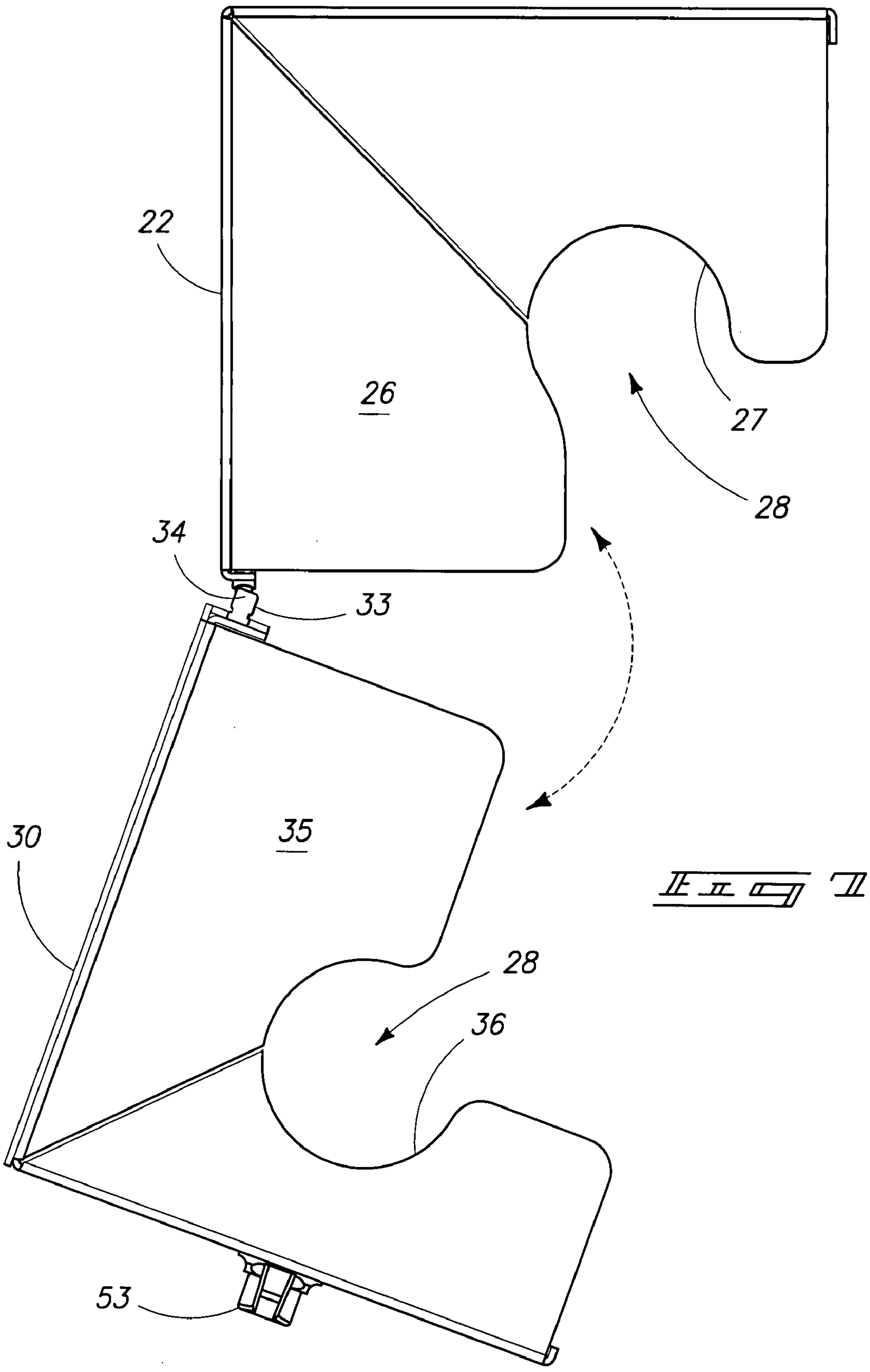
FIG. 7 is a bottom plan view of the bottom sides of the fixed and moveable portions of one embodiment of the invention, shown in an open configuration.
Figure 8:
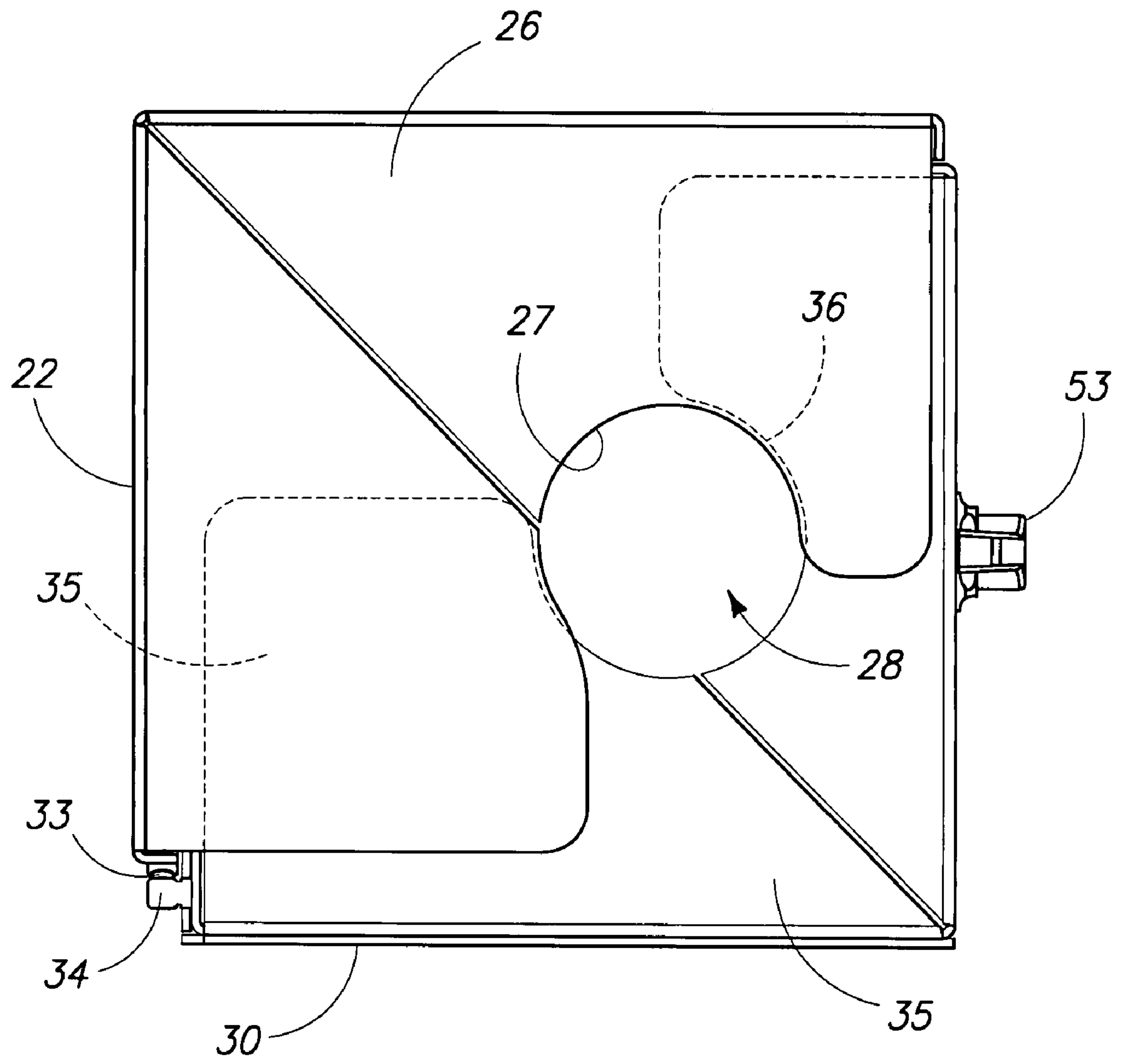
FIG. 8 is a bottom plan view of the bottom sides of the fixed and moveable portions of one embodiment of the invention, shown in a closed configuration.

Referring now to FIGS. 7-8, the conductor aperture 28 is shown in greater detail. As described above, in the embodiment of the invention shown in FIGS. 2-4, the bottom side 26 of the fixed portion 22 has a perimeter edge 27, and the bottom side 35 of the moveable portion 30 has a perimeter edge 36. Together, these perimeter edges 27 and 36 form a conductor aperture 28, which allows passage of the generator conductors 17, as shown in FIG. 5. When the moveable portion 30 is in the open position, as shown in FIG. 7, one skilled in the art will recognize that the generator conductors 17 can easily be installed into the conductor aperture 28. The bottom side 35 of the moveable portion 30 and the bottom side 26 of the fixed portion 22 are substantially on the same plane but slightly offset from each other. Therefore, when the moveable portion 30 is moved to the closed position, the bottom side 35 of the moveable portion 30 substantially overlaps the bottom side 26 of the fixed portion 22, other than for the portions of the bottom sides 26 and 35 that define the conductor aperture 28. When the moveable portion 30 is in the closed position, as shown in FIG. 8, the conductor aperture 28 is fully defined. One skilled in the art will recognize that in this position, the generator conductors 17 are secured within the conductor aperture, while the moveable portion 30 is in the closed and secured position relative to the fixed portion 22.

Referring now to FIGS. 4 and 5, an additional feature of this embodiment of the conductor enclosure 20 is shown. The moveable portion 30 is shown with a handle 53, which rotates to move a latch 55. The handle 53 and latch 55 can be operated to engage the mounting plane 40 so as to secure the moveable portion 30 when it is in the closed position. Of course, many other ways of securing the moveable portion 30 to the fixed portion 22 are possible. The handle 53 also includes a lock 54, which allows the handle 53 to be secured and inoperable without a matching key. Thus, it is recognized that a feature of the present invention is that access to the internal cavity 29 of the conductor enclosure 20 can be substantially prevented even while the internal cavity is "occupied," i.e., the generator conductors 17 are substantially temporarily installed within the enclosure 20. Moreover, when the conductor enclosure 20 is in the occupied condition, and when the moveable portion 30 is in the closed position, the internal cavity 29, the quick-release connectors 42, and the generator conductors 17 are shielded from weather, small animals, vandals, and other potential risks.

Figure 9:
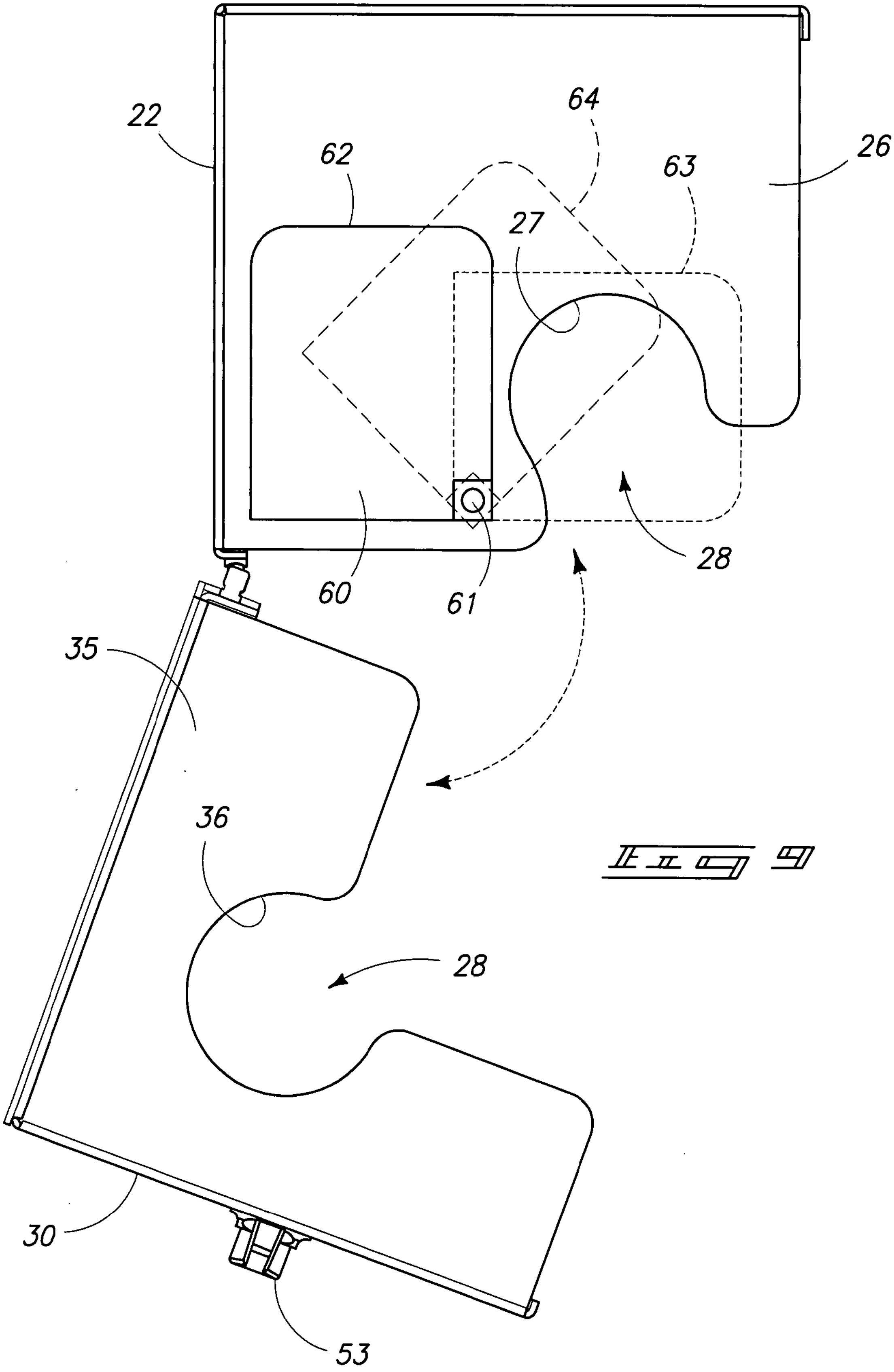
FIG. 9 is a bottom plan view of the bottom sides of the fixed and moveable portions of one embodiment of the invention, showing the conductor aperture cover plate.

Referring now to FIG. 9, an additional feature of this embodiment of the present invention is illustrated. A cover plate 60 is provided and is sized to cover the conductor aperture 28 when the conductor enclosure 20 is in the unoccupied condition, or partially cover the conductor aperture 28 when the conductor enclosure 20 is in the occupied condition. The aperture cover 60 is pivotally mounted to the moveable portion 30 with pivoting hardware 61. This hardware may be one of many types of pivoting hardware that will allow the aperture cover 60 to be manipulable into multiple positions. The plate 60 is only manipulable, however, from within the internal cavity 29 of the framework 21, and when the moveable portion 30 is in the open position. As shown in FIG. 9, the aperture cover 60 may be moved to a fully closed position 62 for when the conductor enclosure is in the unoccupied condition. In this condition, the conductor aperture 28 is substantially fully covered, thus preventing access to the internal cavity 29 when the generator conductors 17 are not installed. The aperture cover 60 may also be moved to a fully open position 63 to allow for passage of the generator conductors 17 when installed. If the generator conductors 17 do not fully occupy the conductor aperture 28, the aperture cover 60 can be moved to an intermediate position 64 so as to cover as much of the remaining conductor aperture 28 not occupied by the generator conductors 17 as possible.

Figure 10:
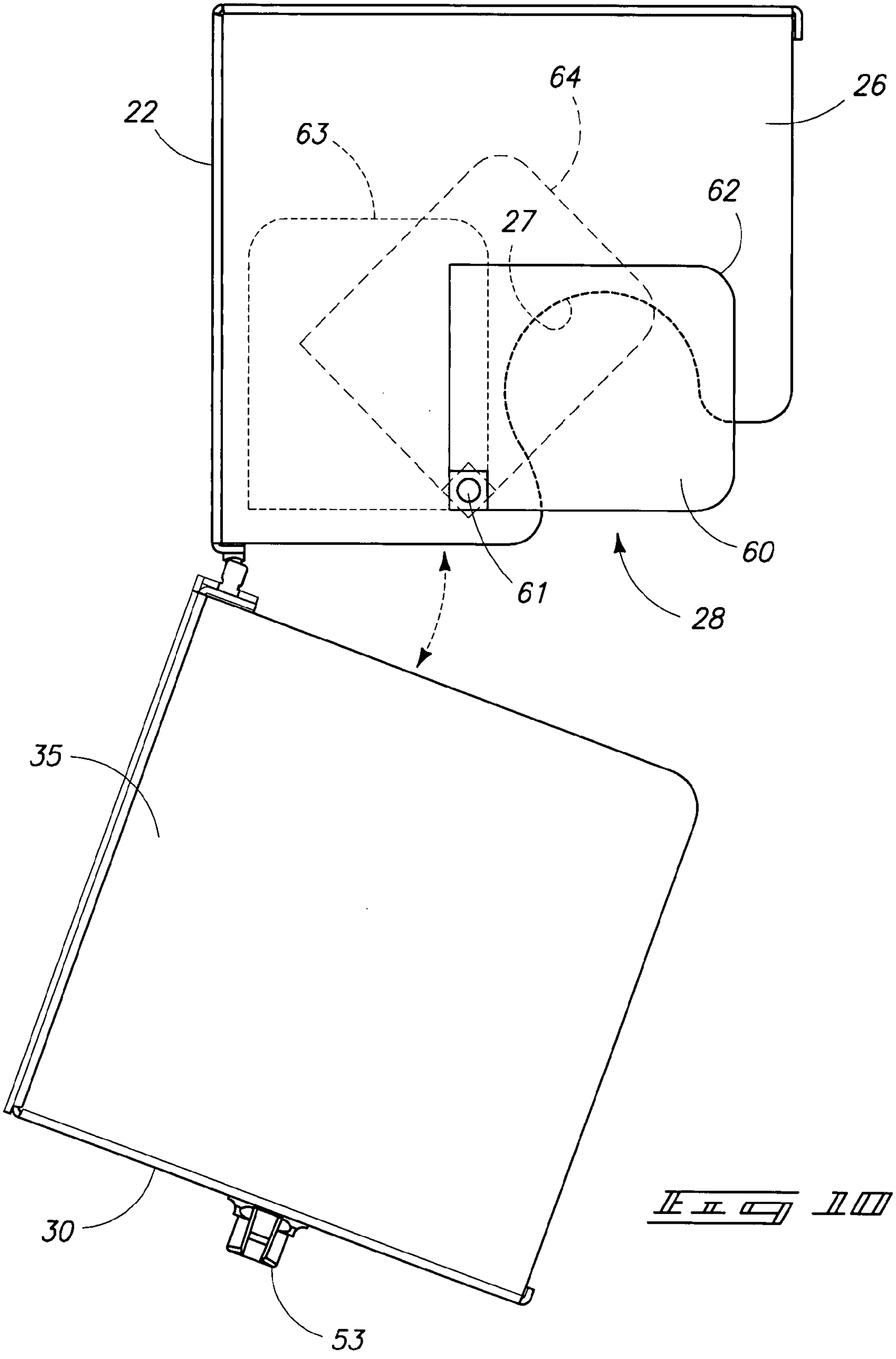
FIG. 10 is a bottom plan view of the bottom sides of the fixed and moveable portions of one embodiment of the invention, showing an alternative embodiment of the present invention.

Referring now to FIG. 10, another embodiment of the invention is shown. In this embodiment, the bottom side 35 of the moveable portion 30 does not define part of the conductor aperture 28. The bottom side 26 of the fixed portion 22 along with the conductor aperture cover 60 together define the conductor aperture 28. In this embodiment, the conductor aperture cover 60 is mounted on the fixed portion 22 with pivoting hardware 61. As shown in FIG. 10, the aperture cover 60 may be moved to a fully closed position 62 for when the conductor enclosure is unoccupied. In this condition, the conductor aperture is substantially fully covered, thus preventing access to the internal cavity 29 when the generator conductors 17 are not installed. The aperture cover 60 may also be moved to a fully open position 63 to allow for passage of the generator conductors 17 when installed. If the generator conductors 17 do not fully occupy the conductor aperture 28, the aperture cover 60 can be moved to an intermediate position 64 so as to cover as much of the remaining conductor aperture not occupied by the generator conductors as possible. It is recognized that the alternative embodiment shown in FIG. 10 will provide all the features and benefits of the present invention as described earlier.

Although the operation of the described embodiment of the invention may be partially or wholly apparent, aspects of its operation will now be discussed.

A first aspect of the present invention relates to an electrical connector enclosure 20, which includes a framework 21 having at least one wall 23, 24, 25, or 26, and which at least partly defines an internal cavity 29. A moveable panel 30 is mounted on the framework 21, the panel 30 being moveable between an open position and a closed position relative to the internal cavity 29. At least one wall 23, 24, 25, or 26 and the moveable panel 30 cooperate to define a conductor aperture 28 when the moveable panel 30 is located in the closed position relative to the internal cavity 28.

Another aspect of the invention relates to an electrical connector enclosure 20 for temporary connections, which includes a framework 21 with a plurality of walls 23, 24, 25, and 26, and which at least partly define an internal cavity 29. A panel 30 is pivotally mounted on the frame 21, and it is moveable between an open position and a closed position relative to the internal cavity 29. At least one wall 23, 24, 25, or 26 and the pivotally mounted panel 30 define a conductor aperture 28 when the panel 30 is in the closed position relative to the internal cavity 28. At least one quick-release connector 42 is positioned within the internal cavity 29, and includes a first end 45, and an opposing or opposite end, second end 46. An electrical conductor 17 is connected to the first end 45 of at least one of the quick-release connectors 42, and the electrical conductor 17 extends from the internal cavity 29 of the framework 21 and through the conductor aperture 28 when the pivotally mounted panel 30 is located in the closed position.

Another aspect of the invention relates to an electrical connector enclosure 20, which includes a framework 21 having at least one wall 23, 24, 25, or 26, and which at least partly defines an internal cavity 29. A moveable panel 30 is mounted on the framework 21, the panel 30 being moveable between an open position and a closed position relative to the internal cavity 29. A conductor aperture 28 through the framework 21 is defined by either at least one wall 23, 24, 25, or 26 and the moveable panel 30, or by at least one wall 23, 24, 25, or 26 and a plate 60 pivotally mounted to the framework 21. The plate 60 is sized so as to cover the conductor aperture 28, and it can be positioned to vary the size of the conductor aperture 28 from uncovered to covered.

Yet another aspect of the invention relates to an electrical connector enclosure 20 for temporary connections, which includes a framework 21 with a plurality of walls 23, 24, 25, and 26, and which at least partly define an internal cavity 29. The internal cavity 29 has an occupied and an unoccupied condition, and wherein the occupied condition is defined as having a substantially temporary electrical conductor 17 present within the internal cavity 29. A moveable panel 30 is mounted on the framework 21, the panel 30 being moveable between an open position and a closed position relative to the internal cavity 29. The panel 30 is moveable when the internal cavity 29 is in the occupied or unoccupied condition. The moveable panel 30 provides access to the internal cavity 29 when in an open position, and substantially prevents access to the internal cavity 29 when in the closed position. At least one wall 23, 24, 25, or 26 and the moveable panel 30 cooperate to define a conductor aperture 28 when the panel is in the closed position relative to the internal cavity 29. A plurality of quick-release connectors 42 are positioned within the internal cavity 29, and each connector includes a first end 45, and an opposite second end 46. A substantially permanent electrical conductor 52 is connected to the second end 46 of one of the quick-release connectors 42 when the internal cavity 29 is in the occupied or unoccupied condition. A substantially temporary electrical conductor 17 is connected to the first end 45 of one of the quick-release connectors 42 when the internal cavity 29 is in the occupied condition. The substantially temporary electrical conductor 17 extends from the internal cavity 29 and through the conductor aperture 28 when the movable panel 30 is located in the closed position.

Yet another aspect of the invention relates to a power connector enclosure 20 for connecting a temporary generator 14, which includes a housing 21 having a fixed portion 22, which at least partly defines an internal cavity 29, and a moveable portion 30 which is mounted on the fixed portion 22. The fixed portion 22 includes a top end 25 of the housing 21, a first side 23 and an adjacent second side 24 of the housing 21, and a portion of a bottom end 26 of the housing 21. The portion of the bottom end 26 of the fixed portion 22 of the housing 21 partly defines a conductor aperture 28. The moveable portion 30 includes a third side 31, and an adjacent fourth side 32 of the housing 21, and a bottom end 35. The bottom end 35 of the moveable portion 30 of the housing 21 also partly defines the conductor aperture 28. The moveable portion 30 is hingedly mounted to the fixed portion 22 with one or more hinges 33, and is moveable between an open position, and a closed position, relative to the internal cavity 29. The moveable portion 30, when located in the open position, provides access to the internal cavity 29 of the housing 21, and when located in the closed position, substantially prevents access to the internal cavity 29 of the housing 21. The conductor aperture 28 is fully defined when the moveable portion 30 of the housing 21 is located in the closed position. A plurality of quick-release connectors 42 are mounted on a common plane 40 within the housing 21. Each connector 42 includes a first end 45, and an opposite second end 46. The common plane 40 is oriented substantially horizontally relative to the surface of the earth, and the second end 46 is oriented so as to extend above the common plane 40, and the first end 45 is oriented to extend below the common plane 40. A temporary power conductor 17 is connected to the first end 45 of one of the quick-release connectors 42, and extends from the internal cavity 29 through the conductor aperture 28 when the movable portion 30 of the housing 21 is located in the closed position. A plate 60 is sized so as to cover the conductor aperture 28, and is pivotally mounted to the fixed portion 22 of the housing 21, and is positionable to vary the size of the conductor aperture 28 from uncovered to covered. A lock 54 is borne by the fixed portion 22 of the housing 21 for securing the moveable portion 30 of the housing 21 to the fixed portion 22 of the housing 21 while the moveable portion 30 is in the closed position. The electrical connector enclosure 20 is mounted upon a switchgear cabinet 11. The housing 21 defines a second aperture 50 which may be coaligned with an aperture 51 defined by the switchgear cabinet 11. A second electrical conductor 52 extends from within the switchgear cabinet 11, through the coaligned apertures 50 and 51 defined by the switchgear cabinet 11 and the housing 21, and is electrically coupled to the second end 46 of the at least one quick-release connector 42.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An electrical enclosure system for the temporary connection of a temporary generator and to electronic switchgear equipment, the enclosure system comprising:

a framework with a plurality of walls;

a panel pivotally mounted on the framework, and moveable between an open position and a closed position relative to a side wall of the framework, wherein when the panel is in the closed position the framework and the panel at least partly define an internal cavity and at least one wall of the plurality of walls and the panel define a conductor aperture;

at least one mounting plane mounted to the framework within the internal cavity; and at least four connectors mounted on the at least one mounting plane to connect with four quick-release mating connectors, and wherein each of the at least four connectors comprises a first end extended outwardly from one side of the at least one mounting plane, and an opposing second end extended outwardly form a second side of the at least one mounting plane, and further wherein the at least four connectors are connected at the first end of the at least four connectors and the at least four quick-release mating connectors having at least four switchgear conductors extended from the electronic switchgear equipment and the second end are connected by the other quick-release mating connectors and the other quick-release mating connectors having at least four generator conductors on the conductor aperture side of the at least one mounting plane.

2. The electrical enclosure system for the temporary connection of a temporary generator and to electronic switchgear equipment, as recited in claim 1 and wherein the framework is a housing.

3. The electrical enclosure system for the temporary connection of a temporary generator and to electronic switchgear equipment, as recited in claim 1, and further wherein the at least one mounting planes on a substantially common plane.

4. The electrical enclosure system for the temporary connection of a temporary generator and to electronic switchgear equipment, as recited in claim 3, and wherein the at least four quick-release connectors are oriented at dissimilar angles to facilitate access thereto.

5. The electrical enclosure system for the temporary connection of a temporary generator and to electronic switchgear equipment, as recited in claim 1, and further comprising:

a plate sized so as to cover the conductor aperture, and wherein the plate is positionable to vary the size of the conductor aperture from uncovered to covered.

6. The electrical enclosure system for the temporary connection of a temporary generator and to electronic switchgear equipment as recited in claim 5, and wherein the plate is pivotally mounted to the framework.

7. The electrical enclosure system for the temporary connection of a temporary generator and to electronic switchgear equipment, as recited in claim 5, the plate is positionable only from within the internal cavity of the framework.

8. The electrical enclosure system for the temporary connection of a temporary generator and to electronic switchgear equipment, as recited in claim 1, and further comprising:

a lock borne by the framework for securing the pivotally mounted panel to the framework while the pivotally mounted panel is in the closed position.

9. The electrical enclosure system for the temporary connection of a temporary generator and to electronic switchgear equipment, as recited in claim 1, and wherein the framework is mounted upon a switchgear cabinet, and wherein the framework defines a second aperture which is coaligned with an aperture defined by the switchgear cabinet, and wherein a second electrical conductor extends from within the switchgear cabinet, through the coaligned apertures defined by the switchgear cabinet and the framework, and which is electrically coupled to the second end of the at least four quick-release connectors.

* * * * *